US012304365B2

(12) United States Patent
Eggensperger et al.

(10) Patent No.: US 12,304,365 B2
(45) Date of Patent: May 20, 2025

(54) OPERATOR PLATFORM AS AN EXCHANGEABLE ASSEMBLY UNIT FOR A DRIVER'S CAB

(71) Applicant: W. Gessmann GmbH, Leingarten (DE)

(72) Inventors: Martin Eggensperger, Heilbronn (DE); Wilhelm Doberstein, Massenbachhausen (DE); Andrew Herzig, Nordheim (DE)

(73) Assignee: W. Gessmann GmbH, Leingarten (DE)

( * ) Notice: Subject to any disclaimer, the term of this patent is extended or adjusted under 35 U.S.C. 154(b) by 288 days.

(21) Appl. No.: 17/806,777

(22) Filed: Jun. 14, 2022

(65) Prior Publication Data

US 2022/0305964 A1    Sep. 29, 2022

Related U.S. Application Data

(63) Continuation of application No. PCT/EP2020/085264, filed on Dec. 9, 2020.

(30) Foreign Application Priority Data

Dec. 17, 2019 (DE) ...................... 10 2019 219 903.8

(51) Int. Cl.
*B60N 2/14* (2006.01)
*B60N 2/08* (2006.01)
*B60N 2/24* (2006.01)
*E02F 9/16* (2006.01)

(52) U.S. Cl.
CPC ........... *B60N 2/146* (2013.01); *B60N 2/0825* (2013.01); *B60N 2/24* (2013.01); *E02F 9/166* (2013.01)

(58) Field of Classification Search
CPC .......... B60N 2/146; B60N 2/06; B60N 2/075; B60N 2/0825; E02F 9/166
See application file for complete search history.

(56) References Cited

U.S. PATENT DOCUMENTS

| 5,011,209 A * | 4/1991 | Takarabe ............... B60N 2/071 296/65.14 |
| 5,228,659 A * | 7/1993 | Potes, Jr. .............. B60N 2/0715 297/344.1 |
| 6,629,572 B2 | 10/2003 | Womer et al. |
| 6,679,349 B1 | 1/2004 | Pollish, Jr. |
| 7,434,863 B2 * | 10/2008 | Hamazaki .............. B60N 2/146 297/344.21 |
| 2003/0230920 A1 | 12/2003 | Itou |
| 2004/0113474 A1* | 6/2004 | Lambrecht ............. B60N 2/067 297/344.1 |
| 2009/0178508 A1* | 7/2009 | Kanda .................. B60N 2/0875 74/491 |

(Continued)

FOREIGN PATENT DOCUMENTS

| AU | 2003298464 A1 | 3/2004 |
| CN | 202115379 U | 1/2012 |

(Continued)

*Primary Examiner* — Daniel J Colilla
(74) *Attorney, Agent, or Firm* — Orbit IP, LLP; Marc G. Martino (57) ABSTRACT

Disclosed is an operator platform designed as an exchangeable assembly unit, for mobile construction machinery, having a carriage for translational adjustment and a rotatable seat mounting for rotary adjustment of a seat, which also relates to a driver's cab with an operator platform of this kind.

15 Claims, 4 Drawing Sheets

(56) References Cited

U.S. PATENT DOCUMENTS

| | | | |
|---|---|---|---|
| 2010/0275472 A1 | 11/2010 | Cunningham | |
| 2016/0288740 A1* | 10/2016 | Katou | B60R 16/027 |
| 2018/0126878 A1* | 5/2018 | Yamada | B60N 2/42709 |
| 2019/0249378 A1* | 8/2019 | Barimani | E01C 23/127 |
| 2020/0223378 A1* | 7/2020 | Mushiake | H04B 5/72 |
| 2021/0170918 A1* | 6/2021 | Kim | B60N 2/3065 |
| 2022/0017027 A1* | 1/2022 | Long | B60N 2/07 |
| 2022/0161694 A1* | 5/2022 | Numajiri | B60N 2/14 |

FOREIGN PATENT DOCUMENTS

| | | | |
|---|---|---|---|
| CN | 103057441 A | 4/2013 | |
| CN | 2 04 369 453 U | 6/2015 | |
| CN | 207481712 U | 6/2018 | |
| DE | 198 13 474 A1 | 10/1999 | |
| DE | 203 20 975 U1 | 8/2005 | |
| DE | 10 2009 038 126 A1 | 2/2011 | |
| DE | 10 2014 107 814 A1 | 12/2015 | |
| EP | 3 524 468 A1 | 8/2019 | |
| KR | 97-31679 U | 7/1997 | |
| KR | 0130035 Y1 | 2/1999 | |
| WO | WO-0041911 A1 * | 7/2000 | B60N 2/01 |

\* cited by examiner

OPERATOR PLATFORM AS AN EXCHANGEABLE ASSEMBLY UNIT FOR A DRIVER'S CAB

CROSS-REFERENCE TO RELATED APPLICATIONS

This continuation application claims priority to PCT/EP2020/085264 filed on Dec. 9, 2020 which has published as WO 2021/122217 A1 and also the German application number 10 2019 219 903.8 filed on Dec. 17, 2019, the entire contents of which are fully incorporated herein with these references.

DESCRIPTION

Field of the Invention

The invention relates to an operator platform, in particular for a mobile construction machine, having a base plate, a control means and a seat, the seat being designed to be adjustable to improve visibility and the entry and exit.

Background of the Invention

Operator platforms are already known from the prior art and have a control means carried on a machine for controlling the machine. Conventional operator platforms also have a seat for an operator of the machine. In particular in the case of machines with low visibility, the seat can be adjusted depending on the visibility conditions in order to be able to monitor the widest possible area around the machine.

Patent specification DD 147 381 discloses an operator platform for a mobile compaction machine which can be pivoted completely laterally to the right or left to improve visibility.

However, the operator platform must be mounted as a complete unit using the rotating device, which places high demands on the stability of the mounting concept. In addition, although the operator platform can be rotated about the axis of rotation over a wide-angle range, the control means is aligned with the operator's seat in such a way that the operator's line of sight is always directed toward the axis of rotation. However, longitudinal or transverse adjustment is not possible. Furthermore, the clarity is largely determined by the weight of the operator platform, which weight prevents the use of a roof or driver's cab.

SUMMARY OF THE INVENTION

Object of the Invention

It is the object of the invention to provide an operator platform which allows translational and rotary adjustment of the seat with the control means carried along and which can be used in a driver's cab in a simple manner.

DESCRIPTION OF THE INVENTION

This object is achieved according to the invention by an operator platform according to the first independent claim.

The operator platform is designed as an exchangeable assembly unit. As a result, production can take place particularly favorably independently of the machine to be operated. The operator platform comprises all functionally relevant components and therefore only needs to be arranged on the machine to be operated via a mechanical and electrical connection.

The operator platform has at least one base plate, a carriage, a seat mounting, a guide, and guide means. Other components are also conceivable. The list is not to be understood as exhaustive.

The base plate has a first and a second through hole which connect the region below the base plate to the region above the base plate. The base plate has a main direction of extension along which a first and a second through hole are formed in the base plate. The main direction of extension of the base plate depends on the installation space available on the machine to be operated. For example, the width of an available driver's cab can be decisive for the length of the base plate in the main direction of extension.

The first and the second through hole serve to accommodate guide means which guide the carriage arranged on the guide means and located above the base plate along a guide arranged below the base plate. The guide is in particular linear. The guide means pass through the first and second through hole, with the end positions of the first and second through hole in the main direction of extension determining a maximum travel path of the guide means within the first and second through hole.

Consequently, only two through holes are required or arranged in the base plate for the translational displaceability of the carriage. As a result, when the carriage is guided in a manner that is stable against tilting, the ingress of dirt into the guide can be reduced and production can be implemented more cost-effectively.

The first and the second through hole are particularly advantageously designed in the form of a linear slot opening. In addition, however, other designs of the first and second through hole are also conceivable.

The base plate is particularly preferably designed in a rectangular shape, which has a particularly favorable effect on a maximum extension of the first and second through hole and thus the maximum transverse adjustment. In general, however, a different shape of the base plate can also be formed. This can be advantageous in particular in the case of non-linearly designed guidance.

The carriage is arranged above the base plate and guided along a guide arranged below the base plate. The load transfer of the carriage takes place via the guide means and the guide. An air gap is formed between the carriage and the base plate, which air gap allows the carriage to slide friction-free over the base plate.

The carriage also serves to transmit the translational movement through the guide to the components of the operator platform that are arranged on the carriage.

A seat mounting can be detachably arranged above the carriage, in particular via screw connections. The seat mounting is designed in multiple parts and has a non-rotatable mounting part arranged on the carriage and a mounting part arranged rotatably relative to the carriage and the non-rotatable mounting part. As a result, the seat mounting can be moved in a translational manner via the carriage and rotated relative to the carriage via the rotatable mounting part.

In a preferred embodiment of the invention, a scraping device and/or sealing device, in particular a brush seal, is arranged in the first and/or second through hole of the base plate. The scraping device can be arranged in and/or on the first and/or the second through hole on the upper side and/or the bottom side of the base plate. As a result, the region below the base plate and the region above the base plate can be connected without the risk of dirt entering the guide.

In addition, other types of scraping devices are conceivable. Elastomer scraping devices are mentioned here as an example, but not exhaustively.

In addition, the carriage and/or the guide means can have a scraping device which removes contaminants from the base plate along the guided movement. In this way, the ingress of dirt through the first and/or second through hole can be prevented.

The lever mechanism is used to adjust a seat and is designed to release and/or block the translational and/or rotary degrees of freedom of movement of the carriage and the seat mounting. For this purpose, the operator platform can have at least one locking device, in particular several, particularly preferably a translational locking device and a rotary locking device. With regard to safety, a blockage of the degrees of freedom of movement by the at least one locking device in an unactuated position (zero position) of the actuating element is particularly favorable.

Also preferred is an embodiment of the invention in which the seat mounting comprises a lever mechanism with a bifunctional actuating element, in particular a lever. A bifunctional actuating element allows two functions to be carried out in a particularly advantageous manner, in particular the control of two devices for the purpose of locking the freedom of movement of the operator platform.

In a preferred development of the invention, it is provided that the actuating element extends over at least two, in particular three, sides of the seat mounting. This allows the actuating element to be actuated particularly easily with the right and/or left hand or with the right and/or left foot.

Also preferred is a development of the invention in which the actuating element is in the form of a bent tube and/or in the form of a bent sheet metal part.

Particularly preferably, the actuating element can form at least two parallel sections, in particular in the form of a bracket, for better operability. As a result, a wider handle of the actuating element can be formed without unnecessary additional input of material and also makes it easier to actuate the actuating element with the foot.

In a preferred development of the invention, the lever mechanism is designed to lock and unlock the carriage and/or the seat mounting.

A development of the invention is particularly preferred in which the lever mechanism has a locking device, in particular a toothed segment, particularly preferably a toothed rack, below the base plate. As a result, the available installation space can be used particularly effectively, and the locking device can be effectively protected from contamination.

A development of the invention is preferred in which the lever mechanism is designed to unlock the carriage by moving the bifunctional actuating element in the direction of the base plate. In other words, the bifunctional actuating element, in combination with the lever mechanism, is designed to allow a degree of freedom of movement, in particular the translational degree of freedom of movement, of the operator platform, in a first actuating direction, in particular a downward movement, of the actuating element.

According to a preferred development of the invention, it is provided that the lever mechanism is designed to unlock the seat mounting by moving the bifunctional actuating element in a direction pointing away from the base plate. In other words, the bifunctional actuating element, in combination with the lever mechanism, is designed to allow a freedom of movement of the operator platform, in particular of the seat mounting, in particular a rotary freedom of movement, in a second actuating direction, in particular an upward movement, of the actuating element.

Also preferred is a development of the invention in which the lever mechanism is designed to lock the seat mounting when the carriage is unlocked and/or to lock the carriage when the seat mounting is unlocked. In other words, when the translational degree of freedom is released, the rotary degree of freedom of movement can continue to be blocked, and when the rotational degree of freedom is released, the translational degree of freedom of movement of the operator platform can continue to be blocked. As a result, an unintentional adjustment can be prevented in a particularly simple manner.

In a preferred embodiment of the invention, it is provided that the guide is designed in multiple parts. The guide can in particular have locally spaced apart partial guides running parallel in their guide direction. The partial guides can be designed differently.

A preferred development of the invention provides that the guide has a rod guide and/or a roller guide, in particular a tapered roller guide. As a result, the advantages of different types of guidance can be combined particularly effectively.

A development of the invention is particularly preferred in which the roller guide has a scraping device, in particular scraping brushes and/or an elastomer seal, which is arranged on the roller guide and runs in front of and behind the roller guide. In this way, the guide can be cleaned particularly advantageously during operation.

Also preferred is an embodiment of the invention in which the carriage and/or the seat mounting has a cable bushing, and electrical control lines of the operator platform are guided through the first and/or second through hole, in particular on and/or in a guide means. As a result, a further through hole in the base plate can be avoided in a cost-effective manner.

In a preferred embodiment of the invention, the first and/or the second through hole is/are designed for the passage of a line. The first and/or the second through hole can have cutouts and/or recesses, in particular on the first and/or second through hole, in order to guide a cable bushing parallel to the guide means through the first and/or second through hole.

Also preferred is an embodiment of the invention in which a cable duct, in particular a drag chain, is arranged on the guide means. As a result, when the carriage is being moved, additional cables can be provided and/or accommodated and a collision with movable components of the operator platform can be prevented.

An embodiment of the invention is particularly preferred in which the guide means is designed for the passage of a line, in particular a cable. For this purpose, the guide means can have a vertical through hole from the bottom side to the upper side of the base plate. Particularly preferably, the guide means can be designed in two parts within a first and/or second through hole, in particular in the main direction of extension of the first and/or second through hole, with the line being guided between the parts of the guide means through the first and/or second through hole.

In a preferred embodiment of the invention, it is provided that the guide means has reinforcement in the predominant region of the cable bushing. This allows the line, in particular the cable, to be fed through in a particularly protected manner while the carriage is being moved.

Also preferred is an embodiment of the invention in which the seat mounting is designed to be adjustable in height and/or reclinable relative to the carriage. For this purpose, the seat mounting can have a height adjustment and/or a recline adjustment. The height adjustment and/or recline adjustment can in particular have a locking device with which the height adjustment and/or recline adjustment is permanently held in a determined position.

The object of the invention is further achieved by a driver's cab according to additional claims.

The driver's cab according to the invention for a mobile construction machine having a lateral and/or upper-side opening is designed to arrange an assembly unit, in particular, according to the claims, by sliding and/or inserting it into the driver's cab.

Further features and advantages of the invention can be found in the description and the drawings. The aforementioned features and those which are to be explained below can each be used individually for themselves or for a plurality of expedient combinations of any kind. The embodiments shown and described are not to be understood as an exhaustive enumeration but rather have exemplary character for the description of the invention.

BRIEF DESCRIPTION OF THE DRAWINGS

The invention is represented in the drawings and is explained in more detail using embodiments. In the drawings.

DETAILED DESCRIPTION OF THE PREFERRED EMBODIMENTS

Figure 1:
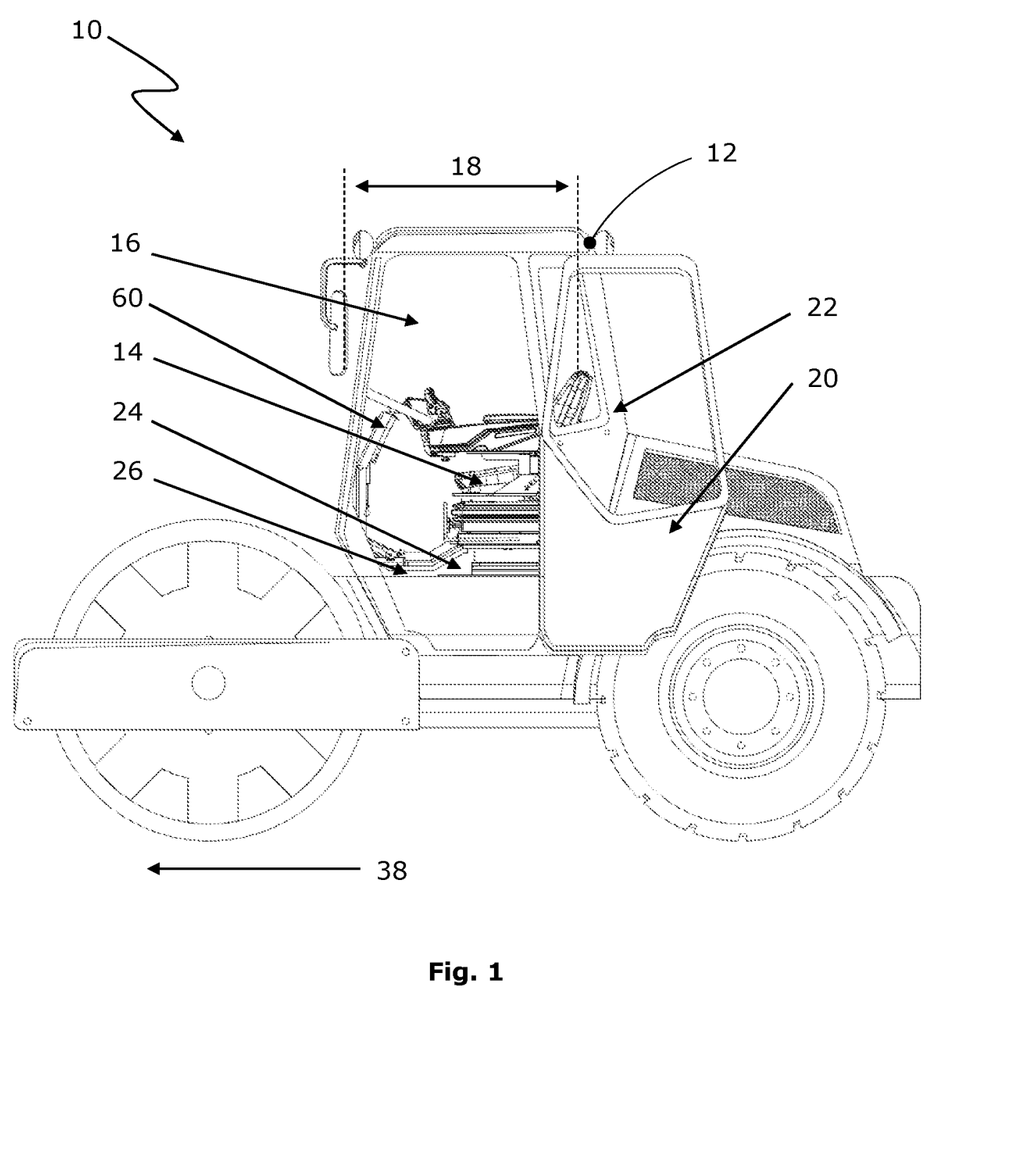
FIG. 1 is a side view of a construction machine with an embodiment of an operator platform according to the invention arranged on the construction machine.

FIG. 1 shows a construction machine 10 with a driver's cab 12 and an operator platform 14 arranged in the driver's cab 12 in the form of an exchangeable assembly unit. The driver's cab 12 has an assembly opening 16 with a clear opening width 18 through which the operator platform 14 can be inserted, in particular pushed in, as a complete assembly unit for arrangement inside the driver's cab 12. This may require that a driver's cab door 20, in particular together with the frame structure 22 of the driver's cab door 20, only be arranged on the driver's cab 12 after the operator platform 14 has been arranged inside the driver's cab 12, or that it be temporarily dismantled for the purpose of the arrangement.

Alternatively or additionally, it can be provided that the driver's cab 12 has the assembly opening 16 on the back and/or the upper side.

This allows a particularly advantageous separate manufacture of the construction machine 10 and the operator platform 14. Also advantageous is the particularly simple way of equipping and/or converting existing construction machines 10. For example, a defective construction machine 10 and/or a defective operator platform 14 can be repaired particularly easily by replacing the operator platform 14.

The operator platform 14 has a base plate 24 which, when installed in the interior of the driver's cab 12, is flush with a driver's cab floor 26. As a result, safety-critical bumps (stumbling blocks) in the driver's cab 12 can be avoided particularly well and cleaning is simplified.

Figure 2:
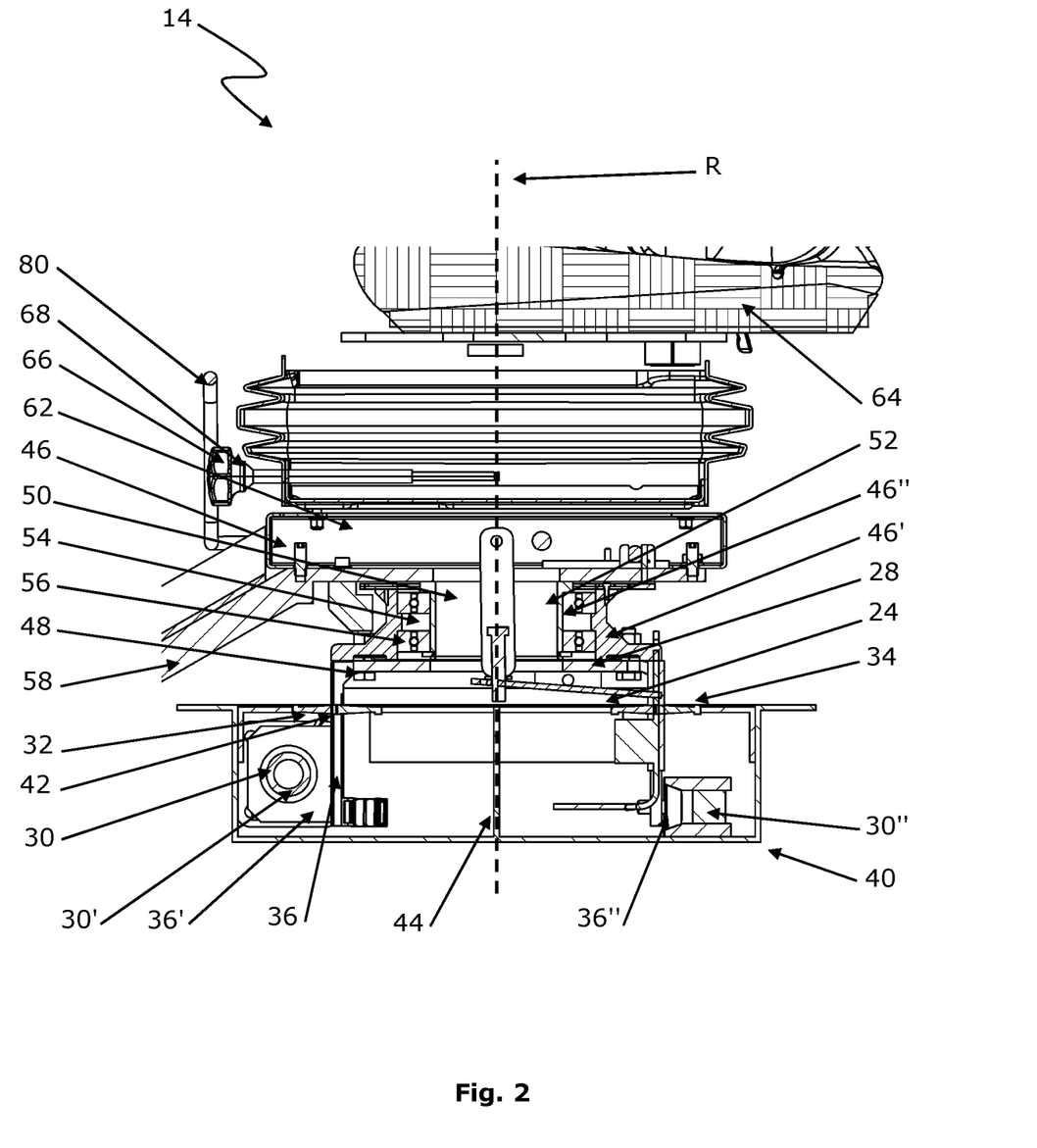
FIG. 2 shows the operator platform from FIG. 1 in a sectional side view.

FIG. 2 shows the operator platform 14 from FIG. 1 in a vertically sectioned view. A carriage 28 is arranged spaced apart from the base plate 24 by an air gap, above the base plate 24. In other words, the carriage 28 is not in load-dissipating contact with the base plate 24. A guide 30 is arranged below the base plate 24 of the operator platform 14. The base plate 24 has a first through hole 32 and a second through hole 34. According to FIG. 2, the through holes 32, 34 extend mainly along an axis directed into the plane of the drawing and are designed in the form of slot openings. In other words, the first through hole 32 and the second through hole 34 connect the regions below and above the base plate 24.

The carriage 28 is guided on the guide 30 via guide means 36 (i.e., vertical guide members). Starting from the carriage 28 arranged above the base plate 24, the guide means 36 reach through the base plate 24 in a vertical direction up to the guide 30 arranged below the base plate 24. The guide means 36 is designed below the first through hole 32 in the form of a bushing 36' with a cylindrical recess, in particular a through hole, and encloses a rod guide 30' of the guide 30. Below the second through hole 34 of the base plate 24, the guide means 36 is designed in the form of a tapered roller 36". Complementary to the guide means 36 in the form of the tapered roller 36", the guide 30 has a tapered roller guide 30". The guide 30 extends in the form of a linear guide predominantly along an axis directed into the plane of the drawing, or parallel to the extension of the first and second through hole 32, 34. In other words, the guide 30 guides the carriage 28 via the guide means 36 along an axis in the main direction of extension of the guide 30, or transversely to an alignment of the control panel, when the operator platform 14 is installed in the longitudinal direction 38 of the construction machine 10 (see FIG. 1).

The specification of the installation position refers to the embodiment shown according to FIG. 1 and can be different depending on the application.

The guide 30 is arranged on the base plate 24 via a housing 40. In other words, the carriage 28 is only guided along the guide 30 via the guide 30, while the other translational and rotary movements of the carriage 28 are prevented by the guide 30. In the embodiment shown, the guide 30 has a load-dissipating bearing function and, in conjunction with the air gap between the base plate 24 and the carriage 28, allows the carriage 28 to slide at a distance and friction-free over the base plate 24, and allows the guide means 36 to slide within the first and second through hole 32, 34.

In the embodiment shown according to FIG. 2, the guide means 36 is designed in multiple parts and is arranged non-detachably on the carriage 28. In general, however, a detachable arrangement on the carriage 28 is also possible. In addition, a one-piece design of the guide means 36, in particular in combination with a detachable and/or non-detachable arrangement on the carriage 28, is also conceivable.

In the first and the second through hole 32, 34, the base plate 24 has a scraping device 42 in the form of a brush seal. The scraping device 42 effectively prevents the entry of contaminants through the first and the second through hole 32, 34. The illustrated scraping device 42 in the form of the brush seal is to be understood by way of example. Further embodiments of the scraping device 42 and their arrangement in and/or on the through holes 32, 34 both below and above the base plate 24 are also conceivable. Furthermore, an arrangement of the scraping device 42 on the carriage 28 or the guide means 36 is conceivable, for example in the form of a brush seal and/or an elastomer sealing lip.

The housing 40 is designed in the form of a trough which is open at the top and has brackets for supporting the base plate 24 covering the housing 40. The guide 30 and the part of the guide means 36 formed below the base plate 24 are located within the housing 40. As a result, contamination of the interior of the housing 40 and of the guide 30 and the guide means 36 can be effectively prevented. The housing 40 also has an inner wall 44 for improved stability and mounting of the base plate 24.

The carriage 28 has a seat mounting 46 arranged on the upper side. The seat mounting 46 is in multiple parts and has a non-rotatable mounting part 46' and a rotatable mounting part 46" arranged on the upper side of the non-rotatable mounting part 46'. The non-rotatable mounting part 46' is detachably arranged on the carriage 28 via screw connections 48. The non-rotatable mounting part 46' has, on a vertical axis through its geometric center, a vertical cylindrical mounting recess 50 for arranging the rotatable mounting part 46". Complementary to the mounting recess 50, the rotatable mounting part 46" has a vertical cylindrical projection 52 for arranging in the mounting recess 50. In other words, the rotatable mounting part 46" is inserted into the non-rotatable mounting part 46' in the direction of gravity. Ball bearings 56 are arranged in the radial intermediate region 54 of the mounting parts 46', 46" and ensure a constant equidistant spacing between the non-rotatable mounting part 46' and the rotatable mounting part 46" and a relative rotational movement between the non-rotatable mounting part 46' and the rotatable mounting part 46", which rotational movement is as friction-free as possible about a common vertical axis of rotation R.

According to the embodiment in FIG. 2, the rotatable mounting part 46" forms a radial boom 58 for arranging a control means 60 (see FIG. 1) in the form of a steering unit. As a result, the control means 60 can particularly advantageously follow the rotational movement of the rotatable mounting part 46". In general, a detachable or non-detachable arrangement of the radial boom 58 and/or the control means 60 on the rotatable mounting part 46" is also conceivable.

The rotatable mounting part 46" further includes an upper-side platform 62 having a seat 64 detachably arranged thereon. The seat 64 is attached to the rotatable mounting part 46" by means of screw connections. The seat 64 has a height adjustment 66 and a recline adjustment 68.

The combined effect of the guide 30 and the carriage 28 arranged on it via guide means 36, the non-rotatable mounting part 46', and the rotatable mounting part 46" allows the seat 64 and the control means 60 to be moved translationally in a transverse direction in a plane parallel to the base plate 24 and rotate about a vertical axis of rotation R relative to the base plate 24. Alternatively or additionally, a superimposed movement in the vertical direction or a tilting movement from the plane parallel to the base plate 24 can be effected by the height and/or recline adjustment 66, 68 of the seat 64.

Figure 3:
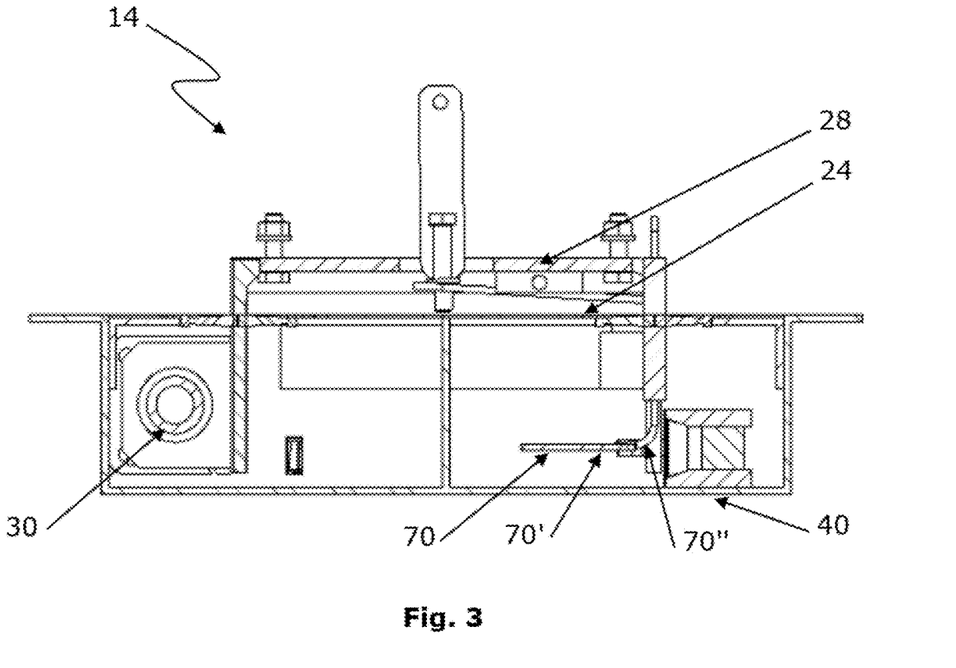
FIG. 3 shows part of the operator platform from FIG. 1 in a sectional side view with carriage and guide.

FIG. 3 shows the base plate 24, the carriage 28, the guide 30, the guide means 36, and the housing 40 in a vertical cross section of the operator platform 14 from FIG. 1 and FIG. 2.

Below the base plate 24, the operator platform 14 has a locking device 70 with an immovable locking component 70' in the form of a toothed segment extending parallel to the guide 30 and a movable locking component 70" in the form of a bolt. In a locked state, the movable locking component 70" engages with the immovable locking component 70', thereby preventing the components from moving relative to each other.

Figure 4:
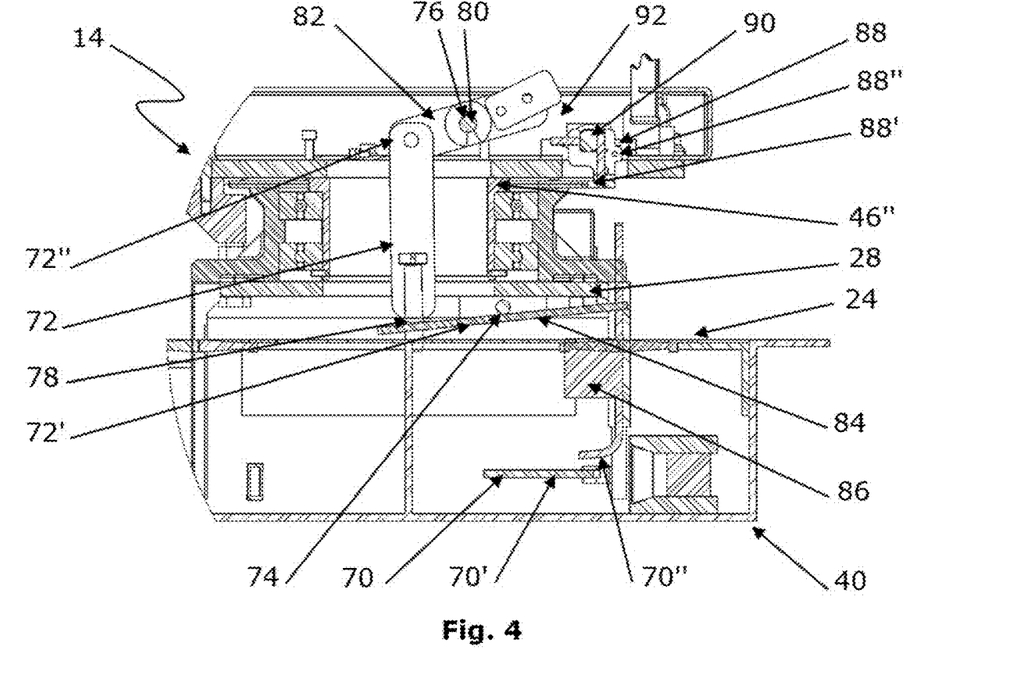
FIG. 4 shows a lever mechanism of the operator platform from FIG. 1 in a first functional position in a sectional partial region.

FIG. 4 shows a detailed view of the operator platform 14 from FIGS. 1 and 2. The immovable locking component 70' is arranged non-detachably on the housing 40. The movable locking component 70" is arranged on the carriage 28 and the mounting part 46" via a lever mechanism 72. The lever mechanism 72 has a displaceable mechanical part 72' [72"] arranged via a first rotary joint 74 on the bottom side of the carriage 28 and a rotatable mechanical part 72" arranged via a second rotary joint 76 on the rotatable mounting part 46". The rotatable mechanical part 72" moves synchronously with the rotatable mounting part 46" and the displaceable mechanical part 72' moves synchronously with the carriage 28. The rotatable mechanical part 72" is arranged on the displaceable mechanism part 72' via a loose vertical push-through connection 78. The push-through connection 78 is arranged in the center of rotation of the rotatable mounting part 46" and allows a translational vertical movement as well as a rotational movement between the displaceable and the rotatable mechanical part 72', 72".

In the locked state (see FIG. 3), the direct translational movement of the rotatable mounting part 46" is blocked by the locking device 70 and, as a result, the translational movement of the non-rotatably arranged mounting part 46', the carriage 28, and the guide means 36 along the guide 30 is prevented. In other words, the locking device 70 prevents the relative translational movement between the seat 64 and the base plate 24 in the locked state (see FIG. 3).

In an unloaded state of the lever mechanism 72—without external influence by a user—the lever mechanism 72 is in a zero position and the locking device 70 is in a locked state. In this way, unintentional translational movement of the seat 64 can be prevented. The push-through connection 78 is in the zero position in a maximum insertion position. In other words, the displaceable mechanical part 72' can only be moved downwards in the vertical direction along the push-through connection 78 relative to the rotatable mechanical part 72".

The lever mechanism 72 has an actuating element 80 arranged in the second rotary joint 76 in the form of a lever for torque transmission to the lever mechanism 72. When the seat 64 is aligned in the longitudinal direction 38 of the construction machine 10, the actuating element 80 forms a lever arm in the longitudinal direction 38 of the construction machine 10. However, it should be noted in this case that the orientation of the lever is only relevant with regard to operation by the user, since the mechanical coupling of the rotatable mechanical part 72" with the displaceable mechanical part 72' takes place in the center of rotation of the rotatable mounting part 46", and the mechanical function is thus independent of a rotation of the seat 64 relative to the base plate 24.

FIG. 4 shows the locking device 70 in an unlocked state. When a torque is applied to the second rotary joint 76 as a result of a downward movement (in the direction of the base plate 24) of the actuating element 80, a rotation of the rocker arm 82 of the rotatable mechanical part 72" takes place, as a result of which the push-through connection 78 is moved downwards in the vertical direction. The downward movement of the push-through connection 78 causes, on the one hand, the lowering of a rocker arm 84 of the displaceable mechanical part 72' and, as a result of the rotatable arrangement of the rocker arm 84 on the first rotary joint 74, on the other end, the raising of the movable locking component 70" arranged at the end of the rocker arm 84. This deflects the movable locking component 70" vertically upward out of its engagement with the immovable locking component 70'. The blockage of the movement in the direction of the guide 30 is thus no longer present and the seat 64 can be adjusted in its position relative to the base plate 24 together with the seat mounting 46 and the carriage 28 along the direction determined by the guide 30. If the desired adjustment of the seat 64 has taken place and the torque on the lever mechanism 72 is canceled by releasing the actuating element 80, the lever mechanism 72 returns to the zero position by a restoring device 86 in the form of a defined weight on the movable locking component 70", and the movable locking component 70" descends back into the engagement state with the immovable locking component 70'.

The seat mounting 46 has a rotary lock 88 having an immovably arranged rotary locking component 88' in the form of a radially encircling toothed ring and, on the non-rotatable mounting part 46', a movably arranged rotary locking component 88" in the form of a bolt arranged on the rotatable mounting part 46" so as to be rotatable about a horizontal axis 90. In the locked state of the rotary lock 88, the movable rotary locking component 88" engages with the immovable rotary locking component 88' and blocks the relative movement between the non-rotatable mounting part 46' and the rotatable mounting part 46". In other words, in the locked state of the rotary lock 88, the seat 64 cannot be rotated about a vertical axis.

In an unloaded state of the lever mechanism 72—without external influence by a user—the lever mechanism 72 is in the zero position and the rotary lock 88 is in a locked state. In the zero position of the lever mechanism 72, the rotatable rotary locking component 88" is arranged loosely on the rotatable mechanical part 72" of the lever mechanism 72.

When torque is applied as a result of a downward movement of the actuating element 80 on the rotatable mechanical part 72" for the purpose of unlocking the locking device 70, the end of the rocker arm 82 of the rotatable mechanical part 72" opposite the push-through connection 78 is detached from the movable rotary locking component 88" as a result of the downward movement of the end of the rocker arm 82 arranged on the push-through connection 78 and forms a functional distance 92 to the movable rotary locking component 88" which remains in its position. It can thus be ensured that, when the locking device 70 is unlocked, the rotary lock 88 is not unlocked at the same time.

Figure 5:
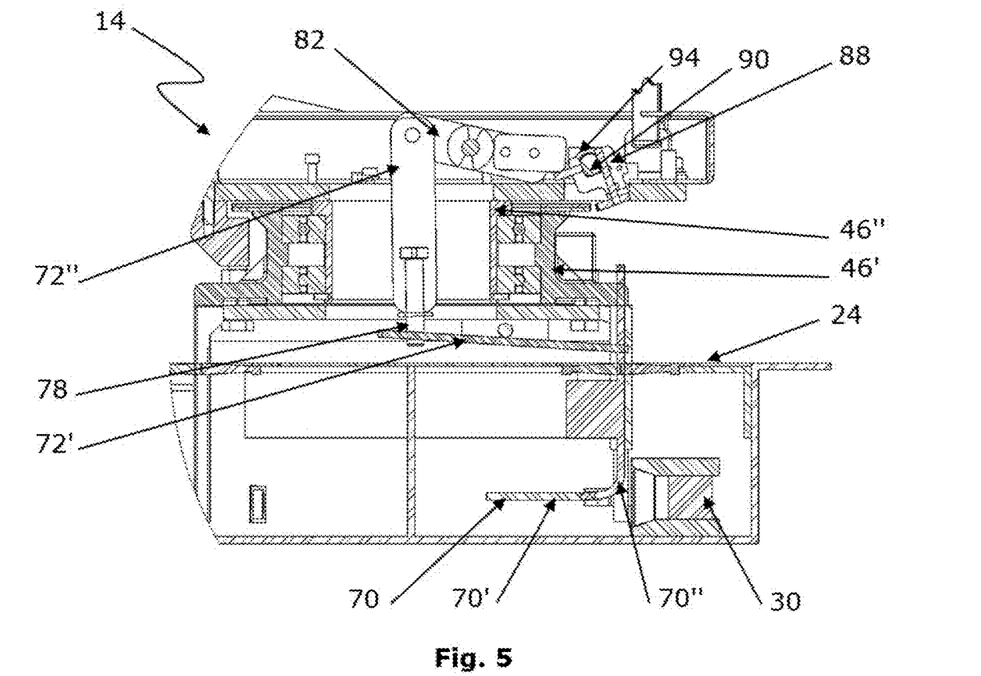
FIG. 5 shows the lever mechanism of the operator platform from FIG. 1 in a second functional position in the sectional partial region from FIG. 5.

FIG. 5 shows the unlocked state of the rotary lock 88 of the operator platform 14 from the previous drawings. An upward movement (in a direction pointing away from the base plate 24) of the actuating element 80 moves the end of the rocker arm 82 of the rotatable mechanical part 72" upwardly, which end is arranged on the push-through connection 78.

As a result, the push-through connection 78 slides upwards out of the displaceable mechanical part 72' without forcing an upward movement. As a result, the movable locking component 70" remains in engagement with the immovable locking component 70' of the locking device 70, and the blockage of the translational movement along the guide 30 remains. In other words, the seat 64 cannot be displaced.

At the same time, raising the end of the rocker arm 82 of the rotatable mechanical part 72" that is located on the push-through connection 78 necessarily causes a downward movement of the end of the rocker arm 82, which end is loosely arranged on the movable rotary locking component 88" and is opposite the push-through connection 78. This rotates the rotary locking component 88''', in the form of the bolt, about the horizontal axis 90 and deflects it out of engagement with the immovable rotational locking component 88'. By eliminating the rotary lock 88, the degree of rotational freedom of the rotatable mounting part 46" relative to the non-rotatable mounting part 46' is released and the seat 64 can be rotated relative to the base plate 24.

When the pulling action on the actuating element 80 ceases, the lever mechanism 72 returns to the zero position and the movable rotary locking component 88", supported by a reverse rotation device 94 in the form of a return spring, rotates about the horizontal axis 90 back into engagement with the immovable rotary locking component 88'. This reliably prevents the seat 64 from rotating in an uncontrolled manner.

In summary, it can be seen that downward movement of the actuating element 80 releases the locking device 70 and allows the seat 64 to be adjusted along the guide 30 without unlocking the rotary lock 88. Furthermore, upward movement of the actuating element 80 can release the rotary lock 88 for rotating the seat without releasing the locking device 70 in the process. The actuating element 80 in the form of a lever is accordingly designed to be bifunctional. When the lever mechanism 72 and the actuating element 80 are in a zero position, both the locking device 70 and the rotary locking device 88 are in the locked state.

Figure 6:
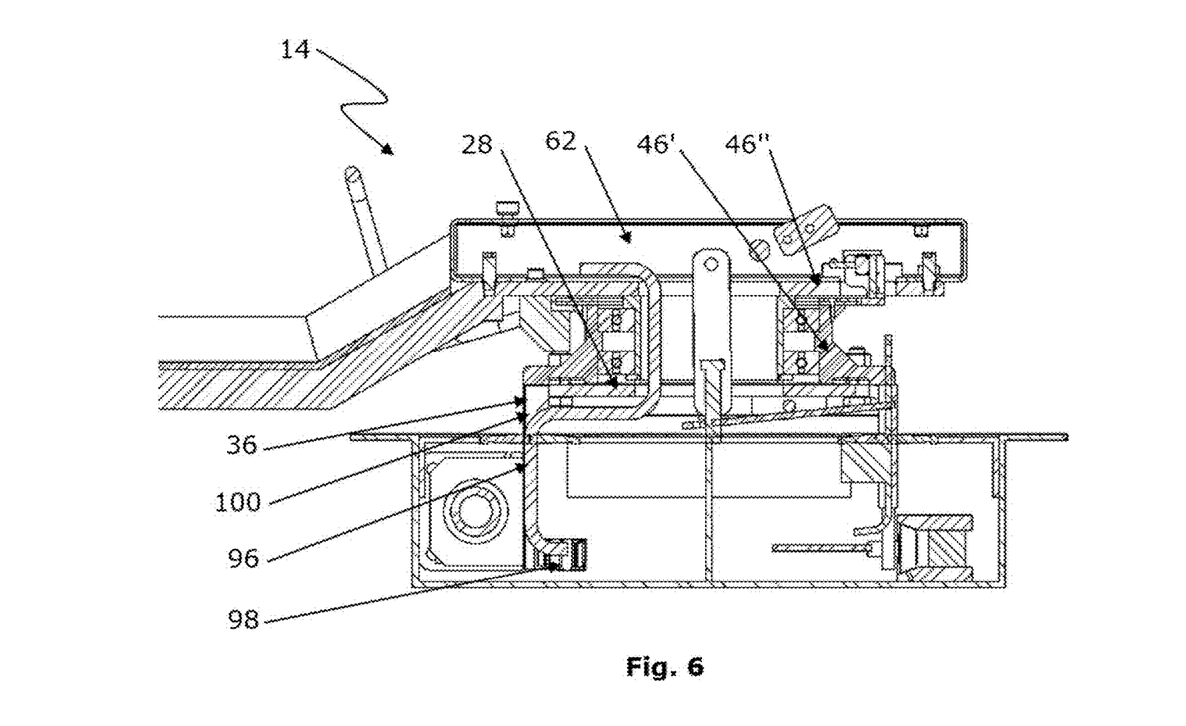
FIG. 6 shows another horizontal section through the operator platform from FIG. 1 with a view of a cable guide.

FIG. 6 shows another vertical section through the operator platform 14 running parallel to the sections from FIGS. 2-5 and serves to explain a cable run 96. The cable run 96 is representative of one or more cables and lines arranged on the operator platform 14 for data transmission and power supply between the operator platform 14 and the construction machine 10. The cable run 96 is supported in the interior of the housing 40 by a flexible cable guide 98 arranged on the guide means 36 in the form of a drag chain and can provide and/or accommodate additional cables when the seat 64 is adjusted. This allows a cable and/or a line to be picked up and released in a controlled manner during the adjustment process of the seat 64 without the risk of the cable run 96 colliding with movable components of the operator platform 14.

The guide means 36 has a vertical guide means recess 100. The guide means recess 100 extends from a region of the guide means 36 formed below the base plate 24 to a region of the guide means 36 designed above the base plate 24. In other words, the guide means 36 has a guide means recess 100 through which the cable run 96 extends within the guide means 36 from the bottom side of the base plate 24 to the upper side of the base plate 24. As a result, a further through hole in the base plate 24 can be avoided. The cable run 96 takes place along the movable components of the operator platform 14.

The cable run 96 extends via a through hole in the carriage 28 and the cylindrical mounting recess 50 into the upper-side platform 62 of the rotatable mounting part 46" and further to the seat 64 and to the control means 60.

Taking all the figures of the drawing together, the invention relates to an operator platform 14 designed as an exchangeable assembly unit, having a carriage 28 for translational adjustment and a rotatable seat mounting 46 for rotary adjustment of a seat 64. The invention also relates to a driver's cab 12 with an operator platform 14 of this kind.

LIST OF REFERENCE SIGNS

Construction machine 10;
Driver's cab 12;

Operator platform 14 in the form of an exchangeable assembly unit;
Assembly opening 16;
Clear opening width 18;
Driver's cab door 20;
Frame structure 22;
Base plate 24;
Driver's cab floor 26;
Carriage 28;
Guide 30;
First through hole 32;
Second through hole 34;
Guide means 36;
Bushing 36';
Rod guide 30' of the guide 30;
Tapered roller 36";
Tapered roller guide 30" of the guide 30;
Longitudinal direction 38 of the construction machine 10;
Housing 40;
Scraping device 42;
Inner wall 44;
Seat mounting 46;
Non-rotatable mounting part 46';
Rotatable mounting part 46";
Screw connections 48;
Cylindrical mounting recess 50;
Vertical cylindrical projection 52;
Radial intermediate region 54 of the mounting parts 46', 46";
Ball bearing 56;
Radial boom 58;
Control means 60;
Upper-side platform 62;
Seat 64;
Height adjustment 66;
Recline adjustment 68;
Locking device 70;
Immovable locking component 70';
Movable locking component 70";
Lever mechanism 72;
First rotary joint 74;
Displaceable mechanical part 72';
Second rotary joint 76;
Rotatable mechanical part 72";
Vertical push-through connection 78;
Actuating element 80;
Rocker arm 82 of the rotatable mechanical part 72";
Rocker arm 84 of the displaceable mechanical part 72';
Restoring device 86;
Rotary locking device 88;
Immovable rotary locking component 88';
Horizontal axis 90;
Movable rotary locking component 88";
Functional spacing 92;
Reverse rotation device 94;
Cable run 96;
Flexible cable guide 98;
Vertical guide means recess 100;
Vertical axis of rotation R.

What is claimed is:

1. An operator platform designed as an exchangeable assembly unit, for a mobile construction machine, comprising:
   a base plate;
   a carriage arranged above the base plate;
   a seat mounting arranged above and on the carriage; and
   a guide arranged below the base plate;
   wherein the base plate forms a first and a second through hole, each in the form of a slot opening; and
   wherein the guide is designed in the form of a linear guide;
   wherein the carriage and the seat mounting are arranged above the base plate;
   wherein the carriage is guided on the guide via vertical guide members which pass through the first through hole and the second through hole of the base plate;
   wherein the carriage is movable translationally along the guide; and
   wherein the seat mounting is rotatable about an axis of rotation;
   wherein the seat mounting comprises a lever mechanism with a bifunctional actuating element, the lever mechanism designed for locking and unlocking the carriage and/or the seat mounting, wherein the lever mechanism is designed to lock the seat mounting when the carriage is unlocked and/or to lock the carriage when the seat mounting is unlocked.

2. The operator platform according to claim 1, wherein a scraping device, being a brush seal, is arranged in the first and/or second through hole of the base plate.

3. The operator platform according to claim 1, wherein the actuating element is designed in the form of a bent tube and/or bent sheet metal part and forms at least two parallel sections, being in the form of a bracket, for better operability.

4. The operator platform according to claim 1, wherein the lever mechanism has a locking device, being a toothed segment, below the base plate.

5. The operator platform according to claim 1, wherein the lever mechanism is designed to unlock the carriage by moving the bifunctional actuating element in the direction of the base plate.

6. The operator platform according to claim 1, wherein the lever mechanism is designed to unlock the seat mounting by moving the bifunctional actuating element in a direction pointing away from the base plate.

7. The operator platform according to claim 1, wherein the guide is constructed in multiple parts.

8. The operator platform according to claim 7, wherein the guide has a rod guide and/or a roller guide, being a tapered roller guide.

9. The operator platform according to claim 8, wherein the roller guide has a scraping device, being elastomer sealing lips and/or scraping brushes, which scraping device is arranged on the roller guide and runs in front of and behind the roller guide.

10. The operator platform according to claim 1, wherein the carriage and/or the seat mounting has a flexible cable guide configured for a data transmission line and/or a power supply line to be disposed therein, the flexible cable guide forming a cable run, and electrical control lines of the operator platform are guided through the first and/or second through hole, via one of the vertical guide members.

11. The operator platform according to claim 1, wherein the first and/or the second through hole is designed for the passage of a line.

12. The operator platform according to claim 1, wherein the flexible cable guide is arranged on the vertical guide members.

13. The operator platform according to claim 1, wherein the vertical guide members is designed for the passage of a line, being a cable.

14. The operator platform according to claim 1, wherein the seat mounting is designed to be reclinable relative to the carriage.

15. A driver's cab for a mobile construction machine comprising the operator platform according to claim 1, wherein the driver's cab has a lateral and/or an upper-side opening which is designed to arrange the exchangeable assembly unit by sliding and/or inserting it into the driver's cab.

* * * * *